US012460421B1

(12) United States Patent
Gosling et al.

(10) Patent No.: US 12,460,421 B1
(45) Date of Patent: Nov. 4, 2025

(54) MASTIC AND MODULAR SEALANT SYSTEMS

(71) Applicant: DIRTT ENVIRONMENTAL SOLUTIONS LTD., Calgary (CA)

(72) Inventors: Geoff W. Gosling, Calgary (CA); Spencer D. Haddow, Calgary (CA)

(73) Assignee: DIRTT ENVIRONMENTAL SOLUTIONS LTD. (CA)

( * ) Notice: Subject to any disclaimer, the term of this patent is extended or adjusted under 35 U.S.C. 154(b) by 0 days.

(21) Appl. No.: 19/052,326

(22) Filed: Feb. 13, 2025

(51) Int. Cl.
*E04F 13/08* (2006.01)
*F16J 15/02* (2006.01)

(52) U.S. Cl.
CPC ...... *E04F 13/0898* (2013.01); *E04F 13/0803* (2013.01); *F16J 15/025* (2013.01)

(58) Field of Classification Search
CPC ... E04F 13/0898; E04F 13/0803; F16J 15/025
See application file for complete search history.

(56) References Cited

U.S. PATENT DOCUMENTS

| | | | | |
|---|---|---|---|---|
| 4,597,235 A * | 7/1986 | Olsen | E04F 13/0803 | 52/762 |
| 4,783,941 A * | 11/1988 | Loper | E04C 2/384 | 52/235 |
| 8,051,623 B2 * | 11/2011 | Loyd | E04F 13/0803 | 52/489.1 |
| 8,341,901 B2 * | 1/2013 | Loyd | E04F 13/0803 | 52/489.1 |
| 8,925,271 B1 * | 1/2015 | Bilge | E04F 13/0875 | 52/506.05 |
| 8,950,131 B2 * | 2/2015 | Loyd | E04F 13/0803 | 52/302.1 |
| 8,966,849 B1 * | 3/2015 | Bilge | E04B 2/721 | 52/506.05 |
| 8,984,838 B2 * | 3/2015 | Bordener | E04B 1/388 | 52/573.1 |
| 9,840,841 B2 * | 12/2017 | Gosling | E04B 2/7457 | |
| 9,856,644 B2 * | 1/2018 | Gosling | E04B 2/7818 | |
| 10,301,821 B2 * | 5/2019 | Gosling | E04B 2/7424 | |
| 11,021,872 B2 * | 6/2021 | Gosling | E04B 9/008 | |
| 11,085,184 B2 * | 8/2021 | Gosling | E04B 2/745 | |
| 11,952,773 B2 * | 4/2024 | Gosling | E04B 2/7453 | |
| 12,000,144 B2 * | 6/2024 | Gosling | E04B 2/7433 | |
| 2005/0246983 A1 * | 11/2005 | Loyd | E04F 13/0803 | 52/235 |
| 2008/0216444 A1 * | 9/2008 | Loyd | E04F 13/0826 | 52/742.16 |
| 2012/0117901 A1 * | 5/2012 | Loyd | E04F 13/0826 | 52/302.1 |
| 2012/0137609 A1 * | 6/2012 | Loyd | E04F 13/0826 | 52/235 |
| 2013/0111840 A1 * | 5/2013 | Bordener | E04B 1/68 | 52/393 |

(Continued)

*Primary Examiner* — Rodney Mintz
(74) *Attorney, Agent, or Firm* — Workman Nydegger

(57) ABSTRACT

A modular sealant system configured to provide customizable sealing solutions for various applications, comprising interchangeable components that facilitate tailored installation, maintenance, and adaptability to diverse environmental and structural conditions. A modular sealant system can comprise a modular wall or frame consisting of horizontals and vertical members, one or more panels, one or more backers, a sealant.

17 Claims, 10 Drawing Sheets

(56) References Cited

U.S. PATENT DOCUMENTS

| | | | | |
|---|---|---|---|---|
| 2016/0348361 | A1* | 12/2016 | Gosling | E04B 2/7407 |
| 2016/0356038 | A1* | 12/2016 | Gosling | E04B 2/7407 |
| 2017/0009450 | A1* | 1/2017 | Gosling | E04B 2/7424 |
| 2017/0089066 | A1* | 3/2017 | Gosling | E04B 2/7854 |
| 2019/0316349 | A1* | 10/2019 | Gosling | E04B 9/008 |
| 2021/0340772 | A1* | 11/2021 | Gosling | B32B 27/10 |
| 2022/0025649 | A1* | 1/2022 | Gosling | E04B 2/78 |
| 2022/0056688 | A1* | 2/2022 | Gosling | E04B 2/7453 |

* cited by examiner

MASTIC AND MODULAR SEALANT SYSTEMS

CROSS-REFERENCE TO RELATED APPLICATIONS

N/A.

BACKGROUND OF THE INVENTION

1. Technical Field

The present disclosure relates to modular sealant systems, particularly those designed for use in sealed environments such as healthcare facilities, laboratories, and cleanrooms.

2. Background and Relevant Art

Modular wall systems are commonly used in various settings, including healthcare facilities, laboratories, and cleanrooms, due to their flexibility, ease of installation, and ability to adapt to changing spatial requirements. These systems may be designed to create temporary or semi-permanent partitions, providing functional and aesthetic solutions for dividing spaces. They may also accommodate integrated features such as electrical wiring, plumbing, or HVAC systems, making them versatile for a wide range of applications.

In sealed environments, such as hospitals and research facilities, modular wall systems face unique challenges. For instance, maintaining strict environmental control, such as air quality, pressure differentials, and temperature, is critical in these settings. Conventional modular wall systems may struggle to provide adequate sealing, leading to potential contamination, compromised sterility, or energy inefficiencies. Gaps, seams, or insufficient integration with other building systems may result in air leaks or hinder the ability to maintain necessary conditions.

Additionally, modular wall systems in these environments may encounter durability and maintenance challenges once installed. Frequent cleaning and sterilization using harsh chemicals can degrade materials over time, reducing the lifespan of the walls. The ability to modify or reconfigure the walls without compromising their integrity or the sealed environment also presents a significant difficulty, particularly in dynamic spaces like operating rooms or cleanrooms where reconfiguration is often required.

Accordingly, there are a number of disadvantages in the art that can be addressed.

BRIEF SUMMARY OF THE INVENTION

The present invention extends to systems, methods, and components directed toward a sealable modular wall system. In particular, implementations of the present invention comprise components that enable a close fitting between various panels, frames, and other surface members, as well as one or more backer components that can be placed within the close fittings. The one or more backer components, in turn, enable a variety of types of mastic materials to be removably positioned against the backer, thereby providing a seal, such as a complete seal, between members of the modular wall.

For example, a modular sealant system can include a first panel selectively coupled to a modular wall, a second panel selectively coupled to the modular wall. The system can also include a backer in communication with the modular wall, a geometry defined by an edge of the first panel, an edge of a second panel, and an end face of the backer. In addition, the system can include a sealant comprising elastomeric properties, and configured to adhere and conform to the geometry. In such an embodiment, the sealant can occupy the geometry and form a seal configured to prevent an ingress or an egress of air, moisture, and contaminants.

Similarly, a method of installing a modular sealant system can comprise an act of assembling a modular wall comprising a first panel and a second panel. The method can also include an act of installing a backer. In at least one implementation, the backer is in communication with a frame member of the modular wall. In addition, the method can include an act of applying a sealant into a geometry defined by an edge of the first panel, an edge of the second panel, and an end face of the backer.

In a further embodiment, a modular sealant system can include a first panel selectively coupled to a first horizontal of a modular wall, a second panel selectively coupled to a second horizontal of the modular wall, and a backer that is selectively coupled to a first prong of a first vertical of the modular wall and selectively coupled to the a first prong of a second vertical of the modular wall. In at least one implementation, the backer is configured to register the first panel and second panel relative to each other, a geometry defined by an edge of the first panel, an edge of a second panel, and an end face of the backer. In addition, the system can include a sealant comprising elastomeric properties configured to adhere and conform to the geometry. In such an embodiment, the sealant can occupy the geometry and form a seal configured to prevent an ingress or an egress of air, moisture, and contaminants.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
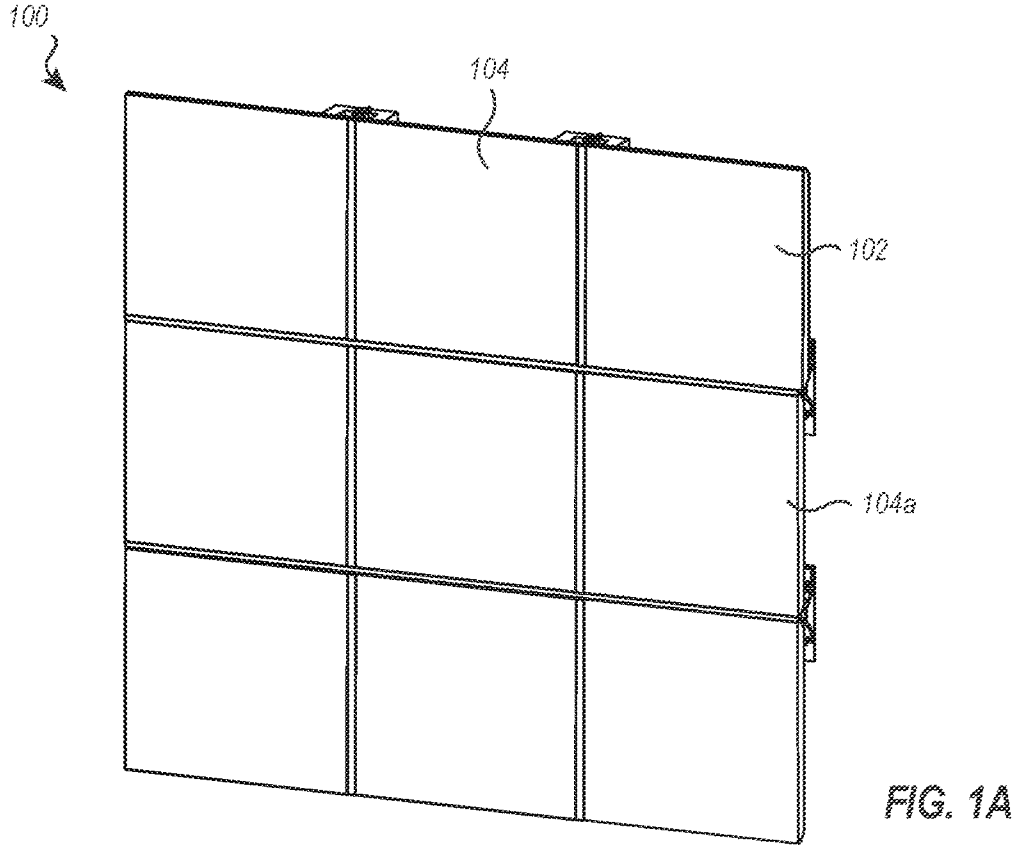
FIG. 1A illustrates a modular wall with a modular sealant system of the present disclosure.

The present invention extends to systems, methods, and components directed toward a sealable modular wall system. In particular, implementations of the present invention comprise components that enable a close fitting between various panels, frames, and other surface members, as well as one or more backer components that can be placed within the close fittings. The one or more backer components, in turn, enable a variety of types of mastic materials to be removably positioned against the backer, thereby providing a seal, such as a complete seal, between members of the modular wall.

Accordingly, modular sealant systems of the present disclosure provide a sterile and sealed surface to a new or existing wall system. In the case of a modular wall, the present disclosure provides a seal that can retain the modularity of a wall system. For example, in the case that access behind a panel of a modular wall is needed, the present disclosure can provide the capability for scoring, cutting, or otherwise separating a modular wall panel along the sealant, which allows for the removal of the modular panel. Unlike conventional systems, the present disclosure can allow for the reinstallation of the same removed panel (or a new panel) and the resealing of the wall system without having to prepare, remove, or otherwise alter the remnants of the seal that exist along the scoring, cutting, or separation. A user, installer, or manufacturer of modular walls will appreciate the ease and versatility of modular sealant systems of the present disclosure in the replaceability, resealability, and retained modularity of their modular wall.

Seams, cracks, gaps, and breaks may be common in some designs of modular walls. For example, in order to achieve modularity, manufacturers will use separable panels, segments, and other modules that can be used, rearranged, and replaced in conjunction with one another to meet a project's specific needs and dimensions. This desired flexibility from removable and rearrangeable components commonly, however, means that there will be many seams, cracks, gaps, and breaks between the components that can bring about propagation points or entry points for air, moisture, or other contaminants. In most environments, the flexibility of the modular system outweighs some of these small gaps. In a medical environment, such gaps still need to be sealed to provide a safe environment.

Embodiments of the present disclosure intend to adapt and account for the various seams, cracks, gaps, and breaks within a modular wall while also allowing the modular wall to remain modular by requiring limited or minimal adjustments to be made to allow access behind the modular wall while also being able to be easily resealed. Environments such as healthcare facilities and cleanrooms, where access or reconfiguration is frequent or needed, would significantly benefit from the modular sealants of the present disclosure. For brevity, modular walls, as herein described, can be replaced with modular doors, ceilings, windows, or any other modular framework or system.

While various embodiments of the present disclosure are illustrated to highlight specific use case scenarios for modular sealant systems of the present disclosure, the present disclosure is designed to provide for and maintain modular seals on a modular or conventional wall. The sealant occupies and conforms to the open spaces between panels of a wall and forms a seal configured to prevent ingress or egress of air, moisture, and/or contaminants, while still preserving the flexibility of removability and rearrange-ability of the modular system components. The present disclosure also provides for a removable thermal and acoustic seal. Backers of the present disclosure provide solid backing for the flowing of a sealant configured to adhere to the components of a wall. Backers can help in defining a geometry wherein the sealant can be maintained, and also removed as needed to rearrange components of the system.

The sealant of the present disclosure can have viscoelastic or elastomeric properties that allow it to return to its original shape after deformation, maintaining a strong bond while accommodating dimensional changes. This allows the sealant to expand or contract while providing its sealing properties to the wall on which it is deployed. In one implementation, the sealant can be a mastic compound. Further, the sealant of the present disclosure can have self-adhering or bonding properties. This enables the modular use, reuse, or adjusted use of the modular sealant systems of the present disclosure. For example, a manufacturer or assembler can cut or score the sealant to allow for access behind the modular wall, modification to the modular wall, or replacement of the modular wall and various sub-components. As such, the below-described embodiment is not meant to be limited to the present disclosure but rather illustrative of the many ways in which modular sealant systems can comprise or how they may be deployed.

Figure 1B:
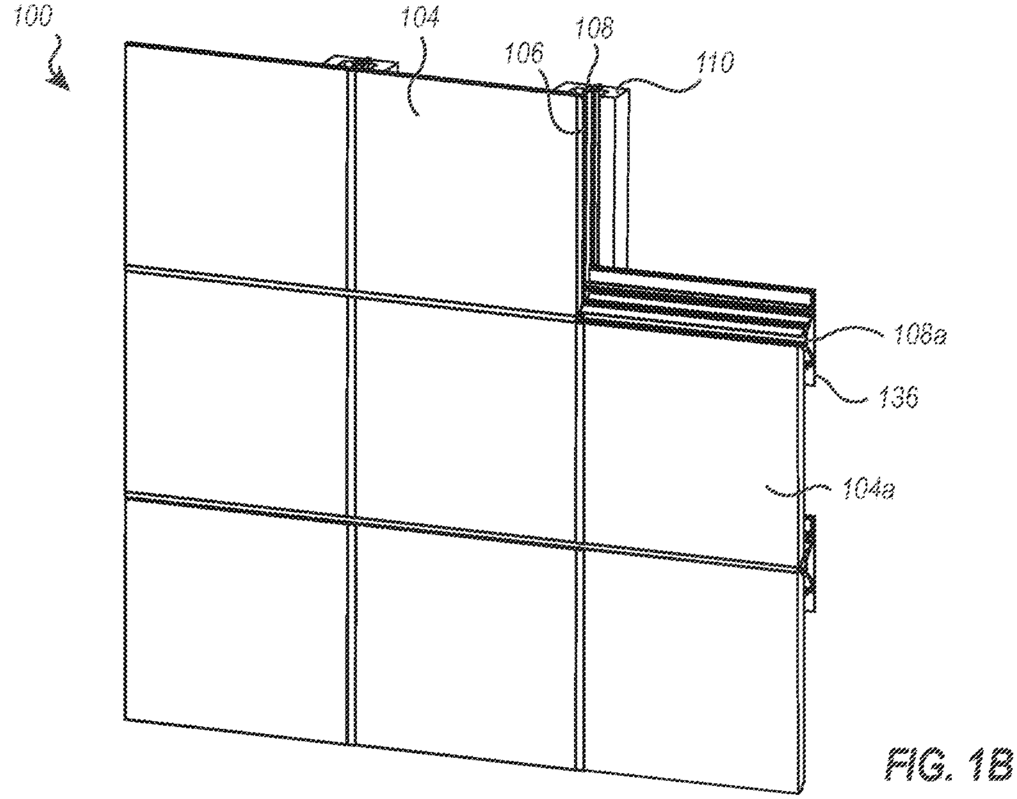
FIG. 1B illustrates an exploded view of the modular sealant system of FIG. 1A.

Referring now to the Figures, FIG. 1A illustrates a modular wall comprising modular sealant system 100. Modular sealant system 100 can be configured to seal both the vertical gaps and spaces between panels (such as between panels 104 and 102) and the gaps and spaces between horizontal panels (such as between 102 and 104*a*). FIG. 1B illustrates an exploded view of modular sealant system 100. A modular sealant system can comprise frame members 110 and 136, backers 108 and 108*a*, sealant 106, and panels 104, 104*a*, and 102. As illustrated, a modular wall can further comprise additional panels, and the vertical and horizontal seams between these panels also have corresponding sealants, backers, and attached frame members.

FIG. 1B illustrates the removal of panel 102 from the modular sealant system to allow for access behind the modular wall. As shown in FIG. 1B, the sealant in the gaps along the edges of panel 102 can have been cut first, allowing the removal of panel 102. A user or installer will appreciate that panel 102 can be reinstalled into modular sealant system 100 by coupling panel 102 to the frame, followed by flowing additional sealant 106 into the gaps between the edge of panel 102 and the rest of modular sealant system 100. In some cases, the existing or residual sealant 106 on the edges of panel 102 or panels 104 and 104*a* can still remain, which may mean that the edges do not need to be cleaned (or the remaining sealant does not have to be removed) first before the reinstallation of panel 102. This can be highly advantageous in the case of a modular wall.

Figure 2:
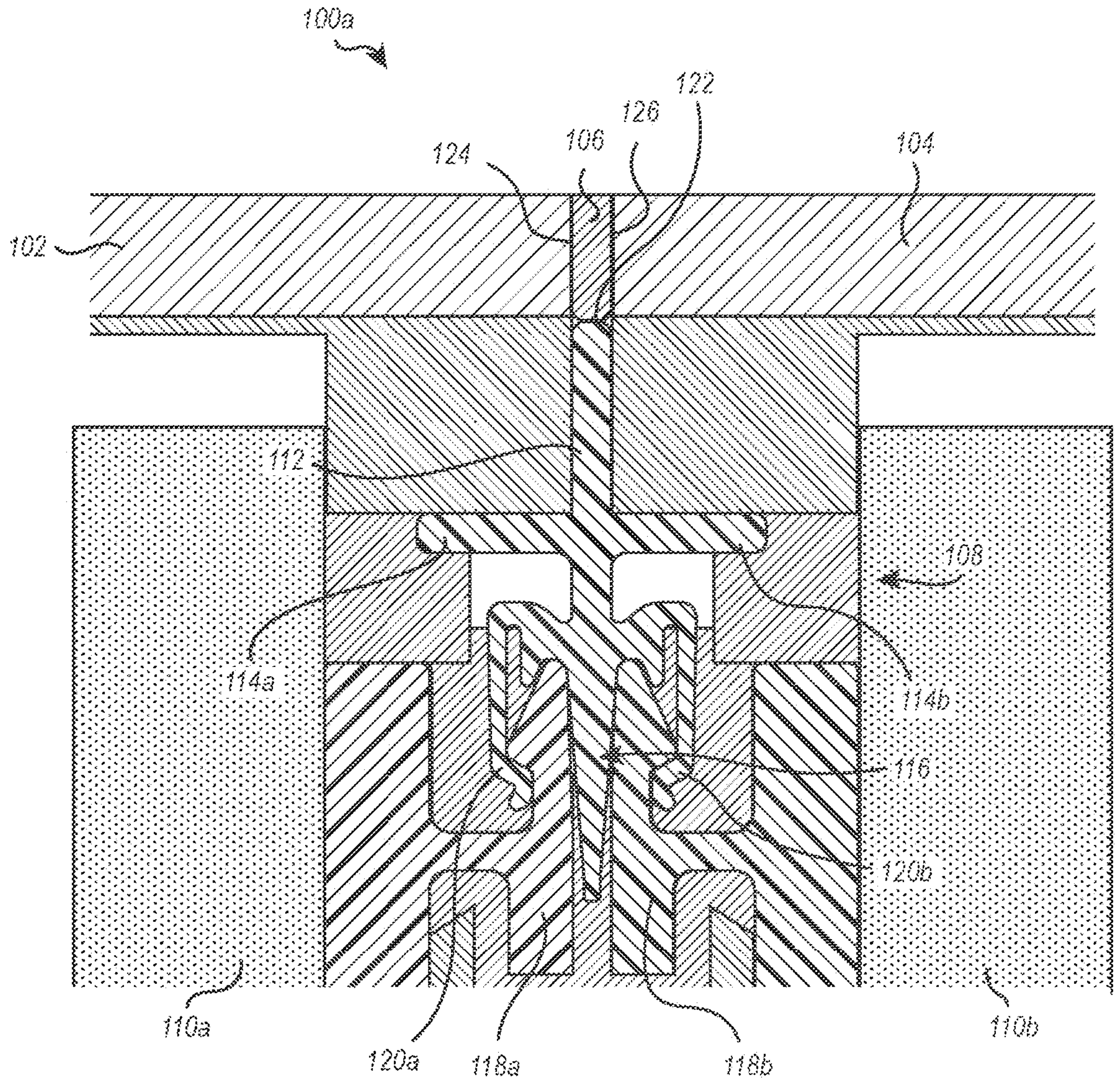
FIG. 2 illustrates a modular sealant system of the present disclosure.

FIG. 2 illustrates an exemplary modular sealant system of the present disclosure, modular sealant system 100*a*. Modular sealant system 100*a* can comprise panel 102, panel 104, sealant 106, backer 108, frame member 110*a*, and frame member 110*b*. FIG. 1 illustrates a top-down perspective of a horizontally oriented modular sealant system 100*a*. Accordingly, modular sealant system 100*a* can span the entire height of a wall, such as from the floor to the ceiling, or at least over a partial length of the total height of a wall, such as along the entire height of panel 102.

As shown in FIG. 2, panel 102 and panel 104 can be constructed by a plurality of materials such as composite wood, stone, MgO, thermoplastic or any other suitable material. A manufacturer or assembler can further coat panel 102 and panel 104 with an outer layer that is constructed from vinyl, epoxy, rubber, antimicrobial paint or sealant, thermoplastics, stainless steel, aluminum, powder-coated metals or alloys, antimicrobial plastics, glass, ceramics, or the like. The manufacturer or assembler can secure panel 102 to a modular wall adjacent to panel 104, such that a gap or seam exists between edge 124 and edge 126. In one implementation, this gap can have a width of about 1 millimeter (mm) to 20 mm. For example, the width can have a range of about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm. This gap can further be dynamic, or at least partly variable, due to the overall construction of the modular sealant system, and minor variances in spacing between panels, tiles, or other components. In addition, one will appreciate that such gap widths may vary over time or at any given time due to the environment in which the modular sealant system is implemented.

As shown in FIG. 2, edge 124, edge 126, and end face 122 can form a geometry, meaning a stabilizing geometry that is sufficient to hold the mastic in place between two adjacent edges of adjacent components, modules, or tiles, etc. Specifically, the geometry (or stabilizing geometry) is configured to provide a backing or receiving space wherein a sealant 106 can be inserted and held without sliding out, dripping out, or otherwise falling from place before having an opportunity to sufficiently stabilize or solidify in place to seal the given gap.

In at least one implementation, the geometry can vary in overall depth, which may be defined by the relative linear distance between the front faces of panels 102 and 104 and end face 122. This distance can range from about 1 mm to about 26 mm. For example, the distance from the front face of panel 102 to end face 122 can be about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, or about 26 mm. The geometry can be varied by the thickness of panels 102 and 104, the length or thickness of register 112, or the overall configuration of backer 108. The thickness of register 112 can further define the minimum gap thickness between panels 102 and 104.

As shown in FIG. 2, backer 108 can be configured to selectively couple to frame members 110*a* and 110*b* and abut panels 102 and 104. Backer 108 can span the entire height of a modular wall, of a panel such as panel 102, or the length of an inset feature (window, panel, drawer, door, compartment, equipment, etc.) of the modular wall wherein modular sealant system 100 is deployed. For example, backer 108 can comprise a sufficiently, flexible rigid seal, gasket, or other material that enables a flexible insertion and/or snap-fit against frame components so that the seal or gasket remains in position. Along these lines, backer 108 can comprise register 112 and supports 114*a* and 114*b*.

As previously described, register 112 can be configured to define a minimum gap between panels 102 and 104 and a controlled depth of the inserted sealant 106. Supports 114*a* and 114*b* can be configured to ensure that the front faces of panels 102 and 104 are of the same elevation or create a flat surface. Register 112 and support 114*a* can form a 90-degree support wherein panel 102 can abut. Register 112 and support 114*b* can also form a 90-degree support wherein panel 104 can abut. Thus, register 112, support 114*a*, and 114*b* can be configured to register panels 102 and 104 in a predefined orientation.

Backer 108 can be configured to act as a backstop, or stabilizing member, during the installation of sealant 106. For example, in one embodiment, an installer can fill the geometry (or space) defined by edge 124, edge 126, and end face 122, with a viscous or semi-solid sealant that is spreadable, extrudable, or flowable. Since the geometry is at least semi-rigid, the sealant can flow and fully fill the geometry. The installer can extrude or flow the sealant in an amount to ensure no air or empty space remains within the geometry. The installer can then smooth the outer layer of sealant so that it has the same elevation as the front face of panels 102 and 104.

In one embodiment, backer 112 can further comprise barbed features or roughed portions that allow sealant 106 to bind to or around. These barbed features or roughed portions can act to aid in retaining sealant 106 within the geometry. Should a user of a modular wall containing modular sealant system 100*a* desire to disinfect or clean the outer surface of modular sealant system 100, they can brush, wipe, or scrub against sealant 106 without causing sealant 106 to fall out of the geometry.

In another embodiment, end face 122 can comprise a guide, channel, or indexing groove configured to guide a knife or means of cutting. This guide, channel, or indexing groove can span the entire length of backer 108 and run parallel to the length of backer 108. A user or installer will appreciate the inclusion of a guide, channel, or indexing groove as it can allow for the quick cutting or scoring of sealant 106 while also assisting in providing a smooth and level separation.

As shown in FIG. 2, backer 108 can further comprise index 116 and members 120*a* and 120*b*. Index 116 can be configured to selectively abut an outer surface of prongs 118*a* and 118*b*. Index 116 can enable the coupling of backer 108 to frame members 110*a* and 110*b*. Members 120*a* and 120*b* are configured to elastically deform such that a tapered geometry of prongs 118*a* and 118*b* can be received within a formed internal portion of backer 108 that is defined by members 120*a* and 120*b* and insert 116. The ability to elastically deform can be due to the properties of the material used to construct the backer 108. In general, the backer can comprise any number or combination of suitably flexible or at least partially rigid or partly deformable materials, such as natural or synthetically produced rubber, plastic, or composites thereof cable of enabling elastic deformation and snapping back into form through the insertion and sealing process. In particular, this elastic deformation further allows a user to spread members 120*a* and 120*b* away from prongs 118*a* and 118*b* so that prongs 118*a* and 118*b* can be removed from the internal portion of backer 108.

As shown in FIG. 2, sealant 106 (mastic) can be inserted and retained in the geometry defined by edge 124, edge 116, and end face 122. Sealant 106 can have a viscous or semi-solid form that is at least partly spreadable, extrudable, or flowable. In one embodiment, sealant 106 can be extruded from a tube or container wherein a nozzle is configured to direct the flow characteristic. Sealant 106 can be at least one of the following: silicone adhesive, acrylic compound, polyurethane sealant, butyl rubber adhesive, epoxy resin, bituminous sealant, latex adhesive, solvent-based sealant, and hybrid polymer adhesive. Sealants of the present disclosure can be putties, thermoplastics, thermosetting materials, pastes, caulking, etc.

In at least one embodiment, sealant 106 is a mastic material, adhesive, or sealant capable of bonding, sealing, or waterproofing. In an exemplary embodiment, sealant 106 is capable of bonding to itself as well as other materials. This sealant can allow for expansion and contraction without tearing or breaking apart due to its inherent flexibility and elasticity, which enables it to absorb movement and stretch in response to temperature changes or mechanical stress. In such an embodiment, the sealant's viscoelastic properties can allow it to return to its original shape after deformation, maintaining a strong bond while accommodating dimensional changes. Additionally, its ability to adapt to shifts in the substrate ensures that it can withstand repetitive expansion and contraction cycles without compromising its integrity. The sealant of this exemplary embodiment can exhibit these traits in both cured and uncured states.

A user or installer of modular walls will appreciate the flexibility of sealant 106 and its ability to rebind to itself after being cut or separated. This self-binding capability can allow a user or installer to cut a sealant line and reseal it without having to remove the excess materials before re-extruding or flowing the sealant again.

As shown in FIG. 2, frame members 110*a* and 110*b* can be two vertical members of a modular wall. Frame member 110*a* can comprise prong 118*a*, and frame member 110*b* can comprise prong 118*b*. Prongs 118*a* and 118*b* can have a tapered geometry that aids in selective coupling with backer 108*b*. Prongs 118*a* and 118*b* can span the entire length of frame members 110*a* and 110*b*, respectively. In at least one embodiment, prongs 118*a* and 118*b* do not span the entire length of frame members 110*a* and 110*b*, respectively; rather, a plurality of prongs 118*a* and 118*b* can be disposed along the length of frame member 110*a*.

In another embodiment, frame members 110*a* and 110*b* can be adapters or connectors to a conventional wall, doorway, or similar. Additionally, only one frame member can be used and still provide sufficient support for coupling to backer 108.

Figure 3:
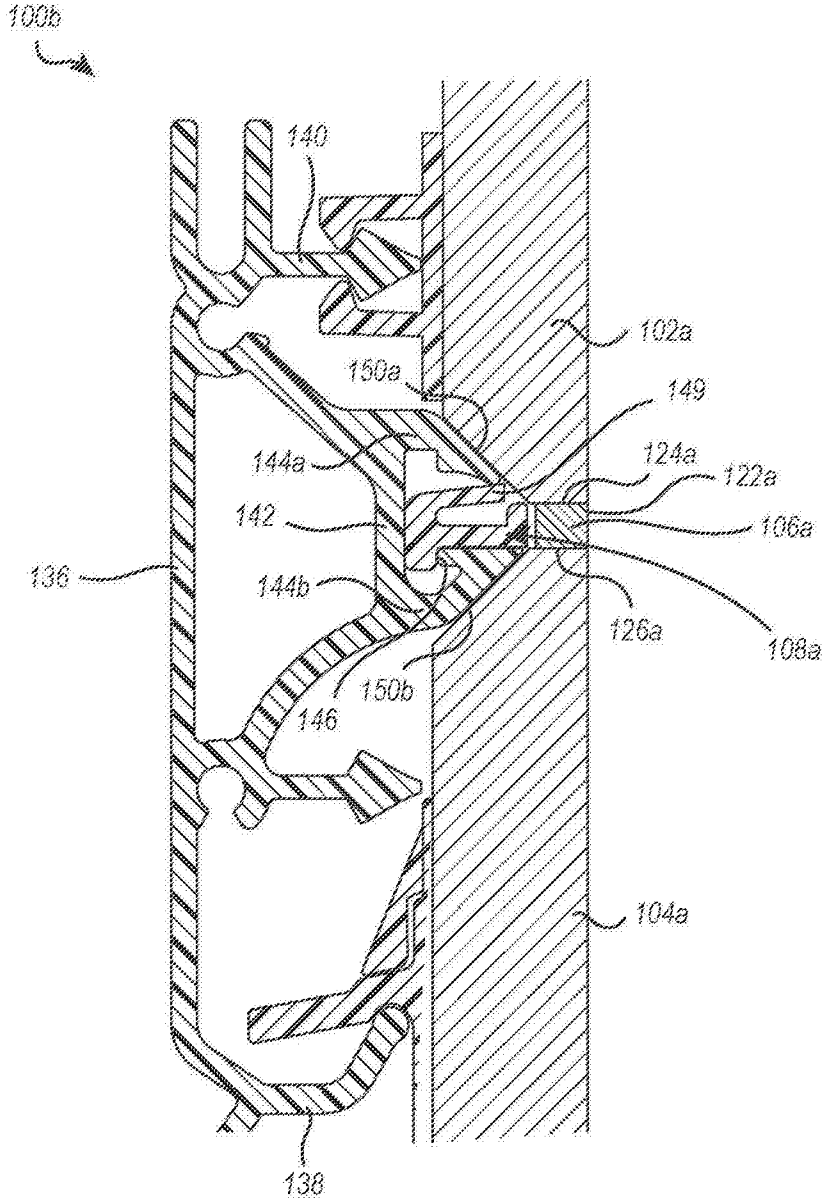
FIG. 3 illustrates another modular sealant system of the present disclosure.

FIG. 3 illustrates another modular sealant system of the present disclosure, modular sealant system 100*b*. Modular sealant system 100*b* can comprise many, if not all, of the same elements as modular sealant system 100*a*. Specifically, modular sealant systems can comprise panel 102*a*, panel 104*a*, sealant 106*a*, backer 108*a*, and frame member 136.

FIG. 3 illustrates a side view of modular sealant system 100*b* such that panel 102 is positioned vertically above panel 104*a*. Modular sealant system 100*b* can then be a horizontal modular sealant system, wherein the geometry and sealant can form a horizontal line to fill in a gap either at the top of or bottom of a panel. In this case, the geometry is defined by edge 124*a*, edge 126*a*, and end face 122*a*. The geometry filled by sealant 106*a* can be substantially similar to the geometry as shown in FIG. 1, i.e., the ranges previously defined are relevant here.

FIG. 3 illustrates another embodiment of a backer, backer 108*a*. Backer 108*a* can have a different shape and configuration than backer 108; however, it can have features and functions similar to those of backer 108. Specifically, backer 108*a* can provide a semi-rigid backing for filling in or inserting sealant 106*a*. End face 122*a* can be configured to stop the flow of sealant into areas behind panels 102*a* and 104*a*, similar to the end face 122. As illustrated, backer 108*a* can be configured to slot into channel 142 or an internal portion of frame member 136. Channel 142 can be defined by arms 144*a* and 144*b*. Arms 144*a* and 144*b* can have internal edges and faces 146 configured to secure backer 108*a*. When inserted, an arm 149 disposed on backer 108*a*, can be compressed to allow backer 108*a* through an opening defined by the ends of arms 144*a* and 144*b*. Once fully inserted then, the arm 149 disposed on backer 108*a* can return back to its original form and expand outwards, away from backer 108*a*, and catch on the internal edges and faces of arms 144*a* and 144*b*. This catching can enable the secured coupling of backer 108*a* into channel 142. A portion of backer 108*a* can extend outwards or protrude outside of channel 142 to ensure a geometry is formed between end face 122*a*, edge 122*a*, and edge 124*a*.

FIG. 3 further illustrates that frame member 136 can be a horizontal frame member of a modular wall. Frame member 136 can have a length that extends across an entire modular wall or at least for a portion of the modular wall. As such, backer 108*a* can have a length similar to or the same as frame member 136. In at least one embodiment, backer 108*a* extends for only a portion of the length of frame member 136, and a plurality of backer 108*a* can be utilized to fully form a geometry wherein sealant can be inserted. Frame member 136 can comprise channel 142 and a plurality of connectors, such as connector 140 and connector 138. The plurality of connectors that frame member 136 can be configured to couple, hang (under the force of gravity), suspend from, or mechanically communicate with panels. As shown, connector 140 can include a tapered prong. The tapered prong can be configured to couple with corresponding arms of a connector embedded or included on a panel (similar to how prong 118*a* and member 120*a* couple). Connector 138 can also be configured to hang panel 104*a* by a hanger disposed on or embedded in panel 104*a*.

As illustrated in FIG. 3, backer 108*a* does not necessarily need to perform as a registration tool for aligning the top and bottoms of panels 104*a* and 102. Instead, arms 144*a* and 144*b* can comprise chamfers 150*a* and 150*b* disposed on the outer surfaces of arms 144*a* and 144*a*. Chamfers 150*a* and 150*b* can be confirmed to correspond to a chamfered edge of panes 102*a* and 104*a*. However, in at least one implementation, the end of backer 108*a* closest to the end face 122*a* can extend in between panels 102 and 104*a* and define a minimum gap width between panels 102 and 104*a* (similar to register 112).

As with backer 108, backer 108*a* can comprise barbs, rough surfaces, or a groove can be disposed along end face 122*a*.

Figure 4:
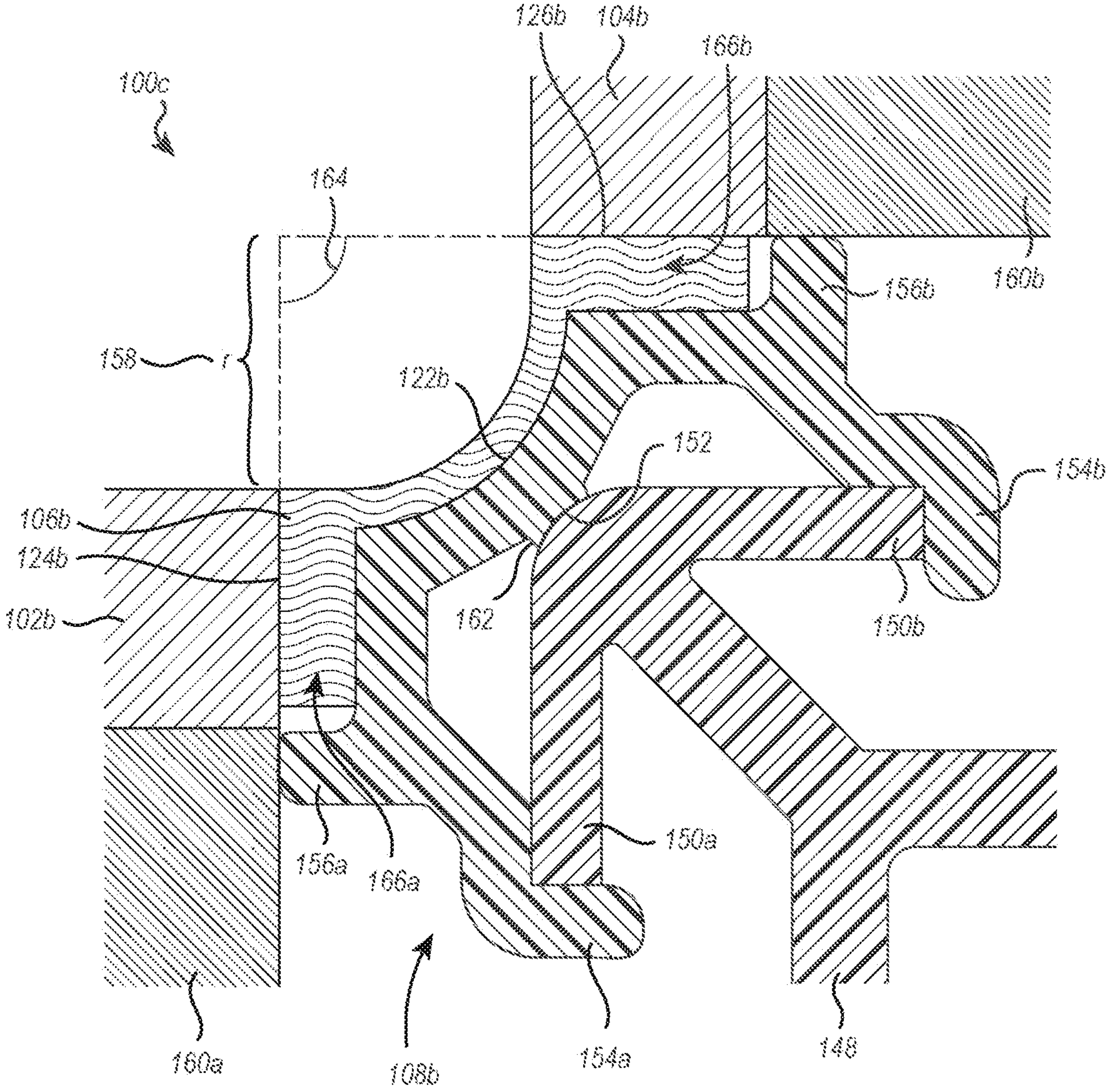
FIG. 4 illustrates a modular sealant system of the present disclosure in relation to a corner of a modular wall.

FIG. 4 illustrates modular sealant system 100*c*. Modular sealant system 100*c* can be deployed at the inner corner of a modular wall. In at least one embodiment, modular sealant system 100*c* can be configured to be deployed at the joint of two modular walls. Modular sealant system 100*c* can comprise similar or the same elements as modular sealant systems 100*a* and 100*b*. Specifically, modular sealant system 100*c* can comprise panel 102*b*, panel 104*b*, sealant 106*b*, backer 108*b*, and frame members 148, 160*a*, and 160*b*. Panels 102*b* and 104*b* can have the same or similar characteristics as the previously disclosed panels. Frame members 160*a* and 160*b* can be vertical frame members or horizontal frame members, as previously disclosed. FIG. 4 is a top-down illustration of a modular sealant system, similar to FIG. 2.

FIG. 4 illustrates the interconnection of backer 108 with frame members 148, 160*a*, and 160*b*. As illustrated, backer 108*b* can comprise arms 154*a* and 154*b*, and struts 156*a* and 156*b*. Arms 154*a* and 154*b* can be configured to selectively couple with prongs 150*a* and 150*b* of frame member 148. Similar to how members 120*a* and 120*b* couple with prongs 118*a* and 118*b*, an installer can elastically deform arms 154*a* and 154*b* around prongs 150*a* and 150*b*. During the installation process, as arms 154*a* and 154*b* are secured around prongs 150*a* and 150*b*, back face 162 contacts surface 152. Surface 152 can be a rounded or angled corner of frame member 148. Regardless of embodiment, surface 152 can be configured to provide a backing or support for backer 108*b*.

During the installation of backer 108*b*, struts 156*a* and 156*b* can be configured to abut and contact frame members 160*a* and 160*b*, respectively. Struts 156*a* and 156*b* can provide an inward clamping force that enables arms 154*a* and 154*b* to be pushed into or against prongs 150*a* and 150*b*. One method of installation can include an installer slidably installing backer 108*b* from the top of frame member 148 downwards to the bottom of frame member 148 rather than spreading or deforming arms 154*a* and 154*b*. Backer 108*b* can have a length similar to or the same as frame member 148. In another embodiment, backer 108*b* has a length shorter than frame member 148.

FIG. 4 shows that backer 108*a* can have a concave and curved end face 122*b*. End face 122*b* can have a pre-defined radius (r) 158. Radius 158 can range from about ⅛ inch to about 2 inches. End face 122*b* can further comprise an angle 164. Angle 164 can range from about 45° to about 179°. For example angle 164 can be about 45°, about 50°, about 55°, about 60°, about 65°, about 70°, about 75°, about 80°, about 85°, about 90°, about 95°, about 100°, about 105°, about 110°, about 115°, about 120°, about 125°, about 130°, about 135°, about 140°, about 145°, about 150°, about 155°, about 160°, about 165°, about 170°, about 175°, or about 179°. Similar to the geometry defined by the end faces in FIGS. 2 and 3, end face 122*b*, edge 124*b*, and edge 126*b* can form a similar geometry. Unlike the geometry in FIGS. 2 and 3 however, space 166*a* and 166*b* are also a part of the overall geometry wherein sealant 106 can be inserted. Spaces 166*a* and 166*b* are defined by the space between edges 124*b* and 126*b* and non-curved end faces of backer 108*b*. In such a case, the length of struts 156*a* and 156*b* defines a minimum thickness of spaces 166*a* and 166*b*.

During the installation of the modular sealant system 100*c*, an installer can use a tool to smooth the curve defined by sealant 106*b*, which is disposed over the curved surface of the end face 122*b*. Users of modular sealant system 100*c* will appreciate that the curved nature of modular sealant system 100*c* provides a single smooth elevation for cleaning. Additionally, the curved elevation is less likely to harbor contaminants due to its ease of being cleaned and not being missed during cleaning, as a more aggressive angular corner may be. As with backers 108 and 108*b*, backer 108*b* can comprise barbs, rough surfaces, or a guide that can be disposed along end face 122*b* or within spaces 166*a* and 166*b*.

Figure 5A:
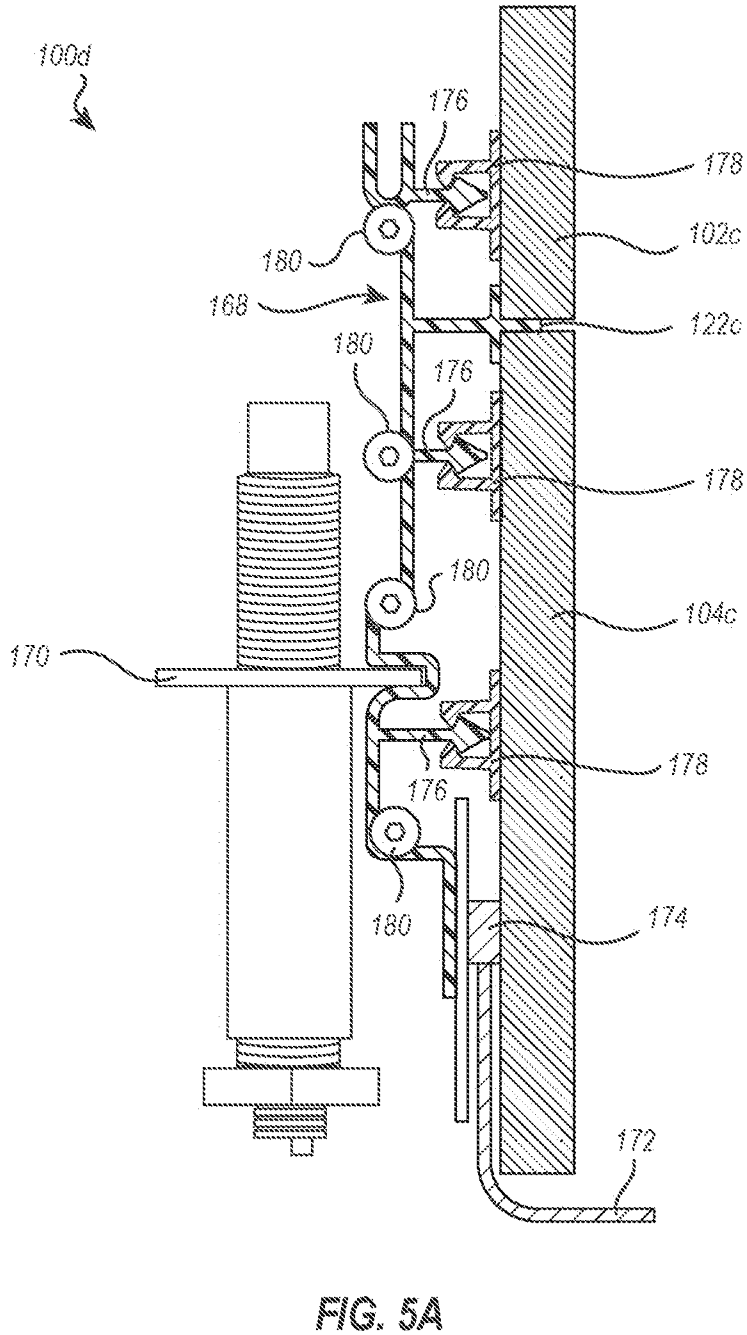
FIG. 5A illustrates a modular sealant system of the present disclosure in relation to a floor.

FIG. 5A illustrates a modular sealant system 100*d* of the present disclosure in relation to a floor. FIG. 5A illustrates a side cross-sectional view of modular sealant system 100*d*. Modular sealant system 100*d* can be used in conjunction with any of the above-disclosure modular sealant systems to provide a sealed wall-to-floor transition. As illustrated, floor 172 can be configured to curve and be received between panel 104*c* and frame member 168. Stopper 174 can be configured to stop and support floor 172 once inserted. Further, stopper 174 can ensure no gap for water, air, or other contaminants to access the area behind panel 104*c*.

As shown in FIG. 5A, frame member 168 can comprise an integrated backer having the same or similar elements as any backer of the present disclosure. Specifically, frame member 168 can have an end face 122*c* configured to define a geometry between panels 102*c* and 104*c* wherein sealant can be inserted. Frame member 168 can have one or more connectors 176 that allow for the coupling to wall panels. Connectors 176 includes a tapered prong. The tapered prong can be configured to couple with corresponding arms of a connector embedded or included on a panel (similar to how prong 118*a* and member 120*a* couple). Connectors 176 can be configured to interfaces with arms of coupler 178. In at least one embodiment, a hanging connector can also be used.

The frame member 168 can be a horizontal frame member that is selectively coupled at its opposing ends to vertical frame members. Frame member 168 can comprise one or more adapters 180 wherein a bolt, fastener, or threaded member can be configured to secure frame member to a vertical frame member of a modular wall. Frame member 168, as with any frame member of the present disclosure, can be an extruded member (e.g., aluminum) wherein its features, e.g., prongs, adapters, backers, stoppers, or otherwise, are continuous along the entire length of the extrusion. In at least one embodiment, features, e.g., prongs, adapters, backers, stoppers, or otherwise, of frame member 168 are not continuous and do not span the entire length of the extrusion.

As shown in FIG. 5A, leveler 170 can be configured to lift or otherwise adjust the distance of panel 104*c* from the ground or the base elevation of floor 172. Leveler 170 can be selectively fastened or coupled to frame member 168. As illustrated, a channel can be included in the extrusion of frame member 168 to allow for the selective coupling of a plurality of levelers along the length of the modular wall.

Figure 5B:
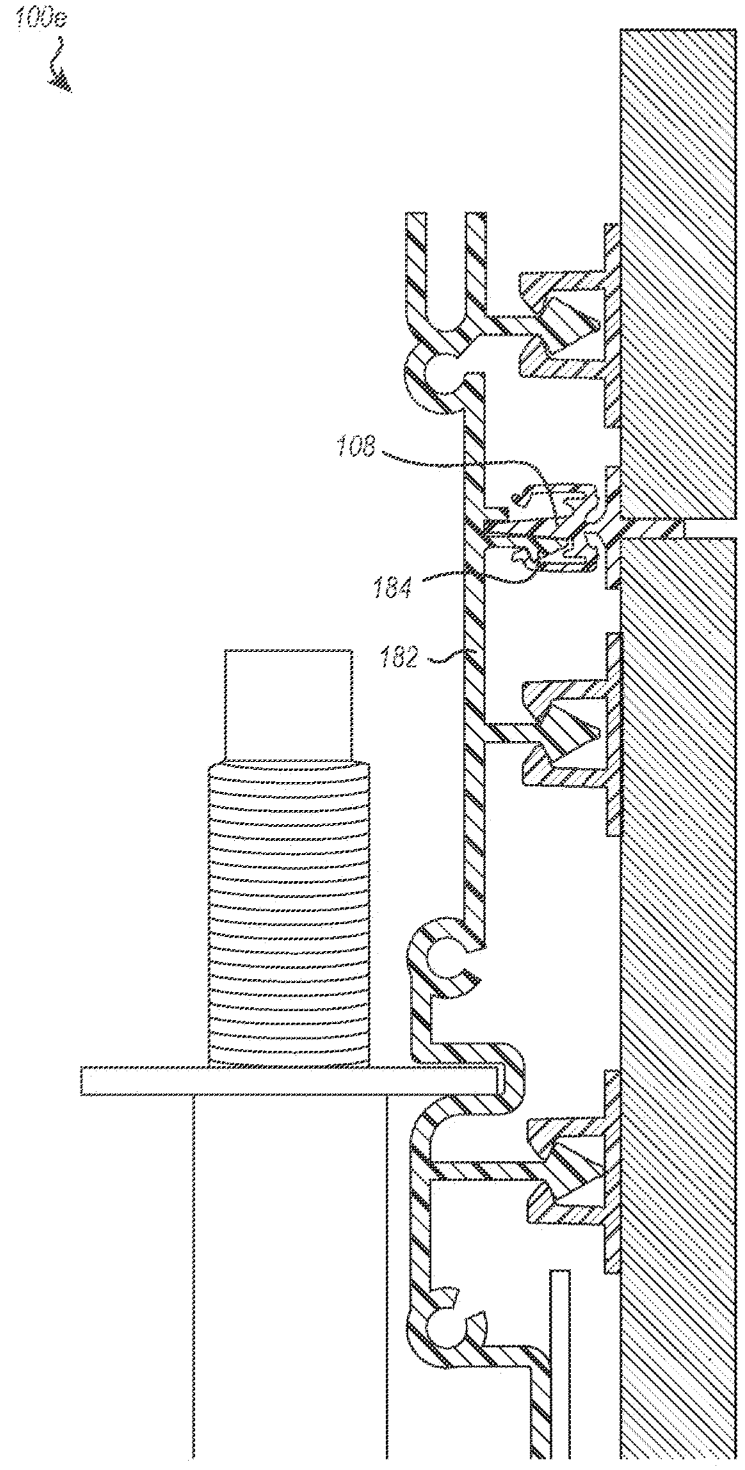
FIG. 5B illustrates a modular sealant system of the present disclosure in relation to a floor.

FIG. 5B illustrates a modular sealant system 100*e* of the present disclosure in relation to a floor. Unlike FIG. 5A, wherein frame member 168 comprises an integrated backer, frame member 182 is instead configured to receive and selectively couple to backer 108 through coupling with prong 184. Prong 184 and backer 108 can interface with each other in a similar manner as prong 118*a* and member 120*a*.

Figure 6:
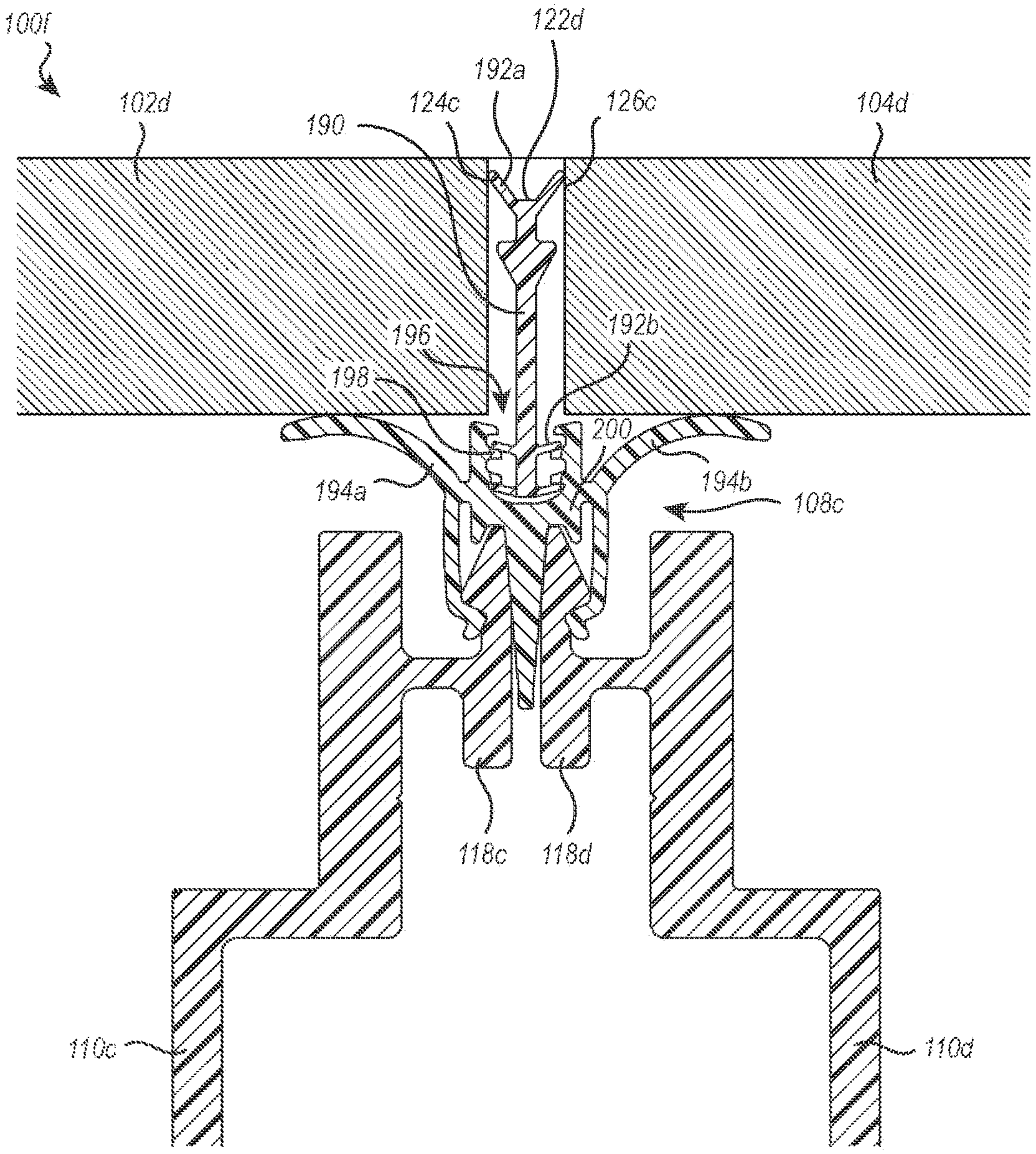
FIG. 6 illustrates a top-down cross-sectional view of a modular sealant system of the present disclosure.

FIG. 6 illustrates a top-down cross-sectional view of modular sealant system 100*f*. Modular sealant system 100*f* can include panels 102*d* and 104*d*. Panel 102*d* can have edge 124*c* and panel 104*d* can have edge 126*c*. Panel 102*d* and 104*d* can have similar or different thicknesses. Modular sealant system 100*f* also can include backer 108*c*. Backer 108*c* can be a multi part system having first part 190 and second part 200. First part 190 can be selectively secured within receiving slot 196 of second part 200. Receiving slot 196 can have one or more teeth 198 configured to engage with one or more barbs 192*b* that are disposed along the length of first part 190. In at least one embodiment, the one or more barbs 192*b* can allow for an assembler to insert more or less of the first part 190 into the receiving slots 196.

This is advantageous as it can allow an assembler to control the dimensions of the geometry formed by edge 124c, edge 126c, and end face 122d (i.e. controlling the position of end face 122d).

FIG. 6 shows first part 190 having one or more barbs 192a. Barbs 192a can be flexible members configured to contour or form within the space between edge 124c and edge 126c. Barbs 192a can extend from end face 122d and assist in defining the geometry that can be fillable with a sealant of the present disclosure.

FIG. 6 also shows that second part 200 can have one or more supports 194a and 194b. Supports 194a and 194b can be analogous to supports 114a and 114b. Supports 194a and 194b can extend outwards towards panels 102d and 104d in a curved fashion and be configured to contour or form to the panels 102d and 104d. It can be advantageous for supports 194a and 94b to form to the panels 102d and 104d as the supports can press against the panels ensuring a rigid connection.

FIG. 6 illustrates that second part 200 can be configured to be secured to prongs 118c and 118d of frame members 110c and 110d as with backer 108 previously disclosed.

Figure 7:
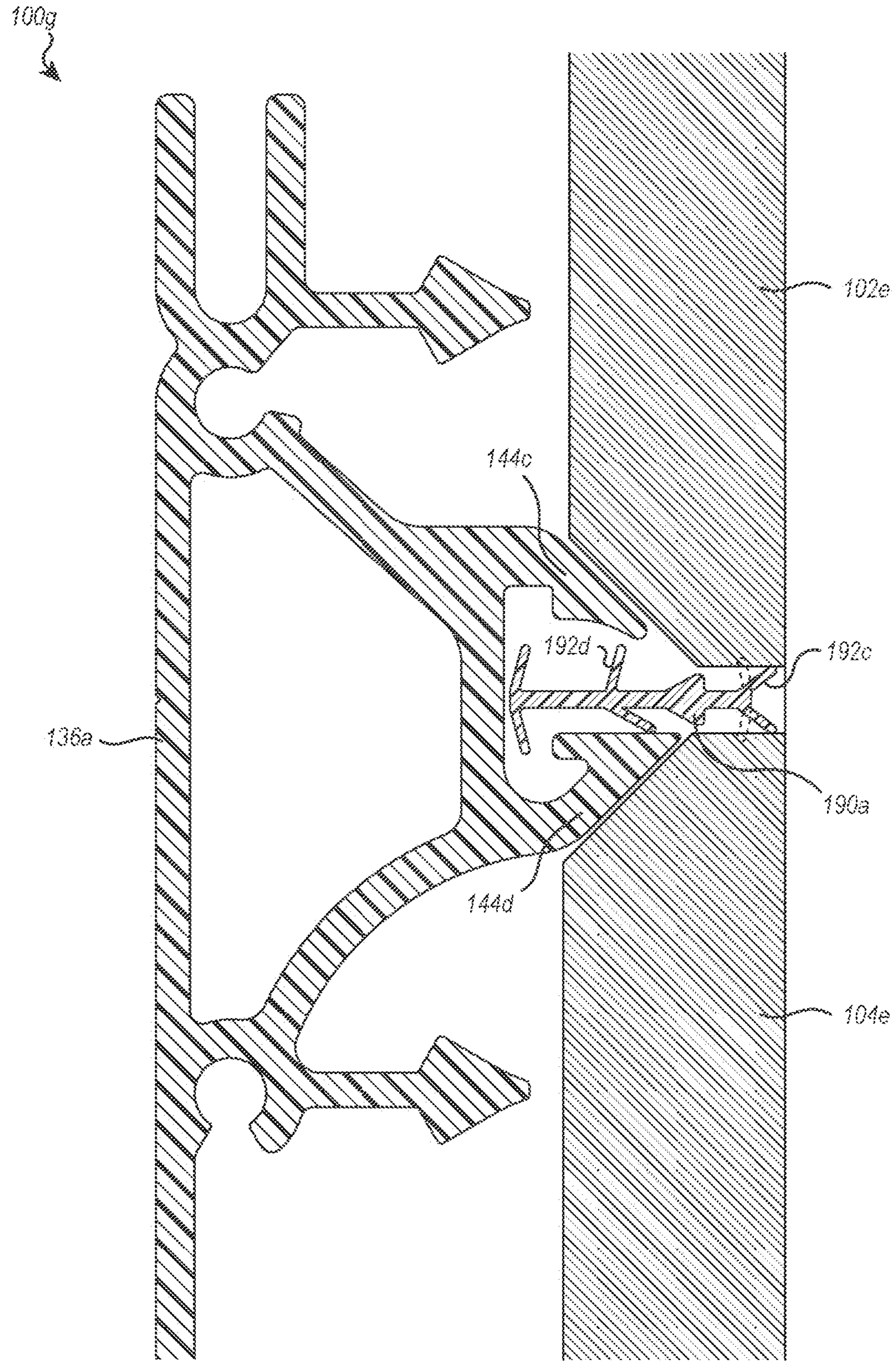
FIG. 7 illustrates a side profile cross-sectional view of a modular sealant system of the present disclosure.

FIG. 7 illustrates a side profile cross-sectional view of a modular sealant system 100g. Modular sealant system 100g can comprise a frame member 136a, panels 102e and 104e, first piece 190a, and a sealant of the present disclosure. First piece 190a advantageously can be used as a stand-alone backer in modular sealant system 100g. First piece 190a can comprise one or more barbs 192c and 192d. A resting position of barbs 192c are shown in phantom line indicating the degree to which they can contour or form to modular sealant system 100g, providing a backing for a sealant to be introduced into the geometry as shown and discussed throughout the disclosure. Barbs 192d can contour and form to arms 144c and 144d of frame member 136a which together act to retain first piece 190a within frame member 136a. An assembler will appreciate the versatility of first piece 190a and its ability to act as a stand-alone backer or in conjunction with a second piece of the present disclosure to form a multi part backer, shown in FIG. 6.

Figure 8:
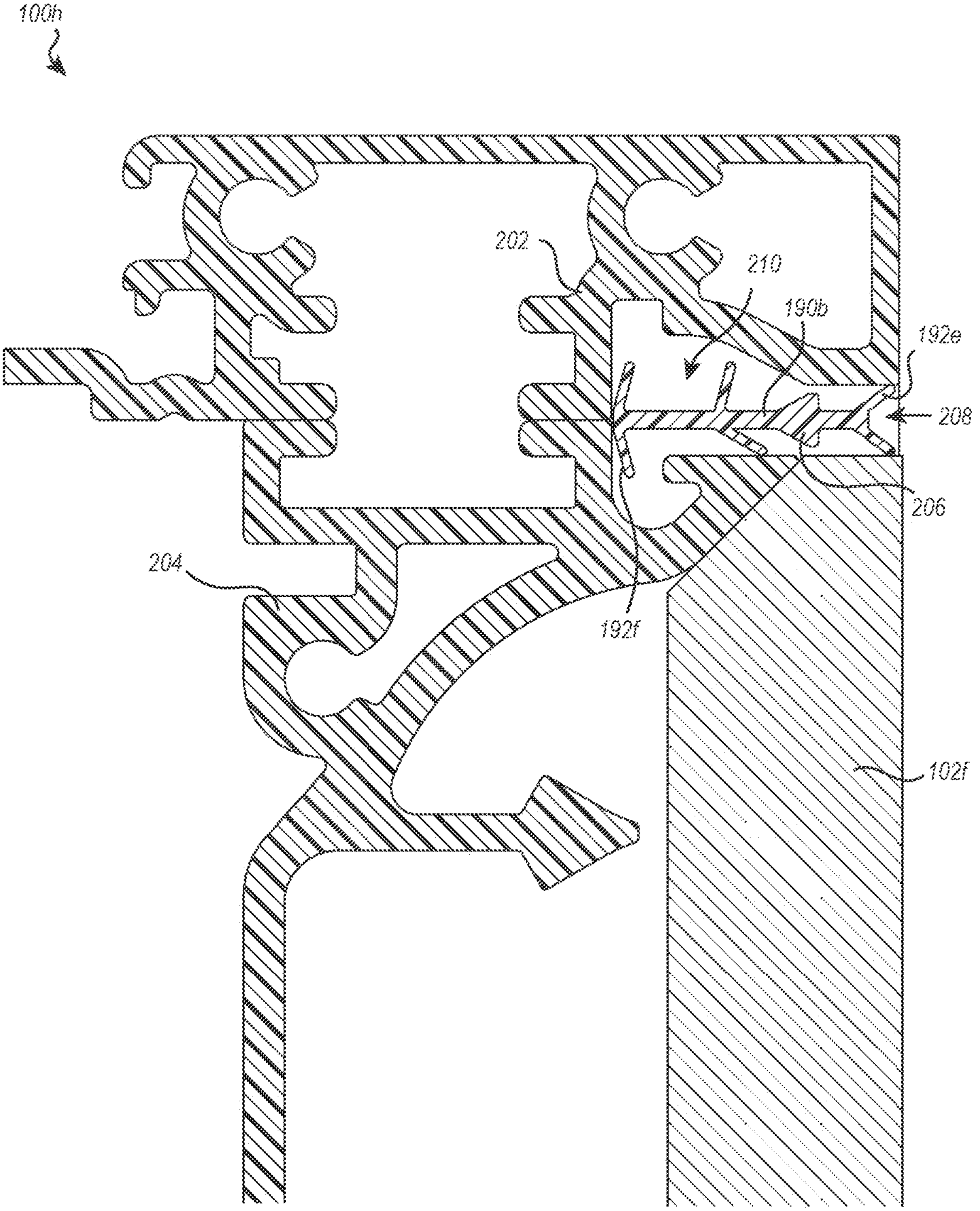
FIG. 8 illustrates another side profile cross-sectional view of a modular sealant system of the present disclosure.

FIG. 8 illustrates a side profile cross-sectional view of a modular sealant system 100h. Modular sealant system 100h can be installed along or adjacent to the ceiling of a room or space. Specifically, frame member 202 can be configured to mount to or along a ceiling or similar surface. Modular sealant system can include a first piece 190b having barbs 192e, barbs 192f, and support 206. Support 206 can be a rigid or semi rigid member that is configured to retain first place 190b within the space between frame member 202 and panel 102f. Rather than a geometry being defined between edges of panels and an end face of a backer or first piece (shown throughout the description), a geometry can be formed between frame member 202, panel 102f, and first piece 190b. In at least one embodiment, geometry 208 can be defined substantially by barbs 192e of first piece 190b. A sealant can then be inserted into the defined geometry, such as geometry 208. First piece 190b can utilize barbs 192f to retain itself within space 210 that is defined by frame members 202 and 204.

Figure 9:
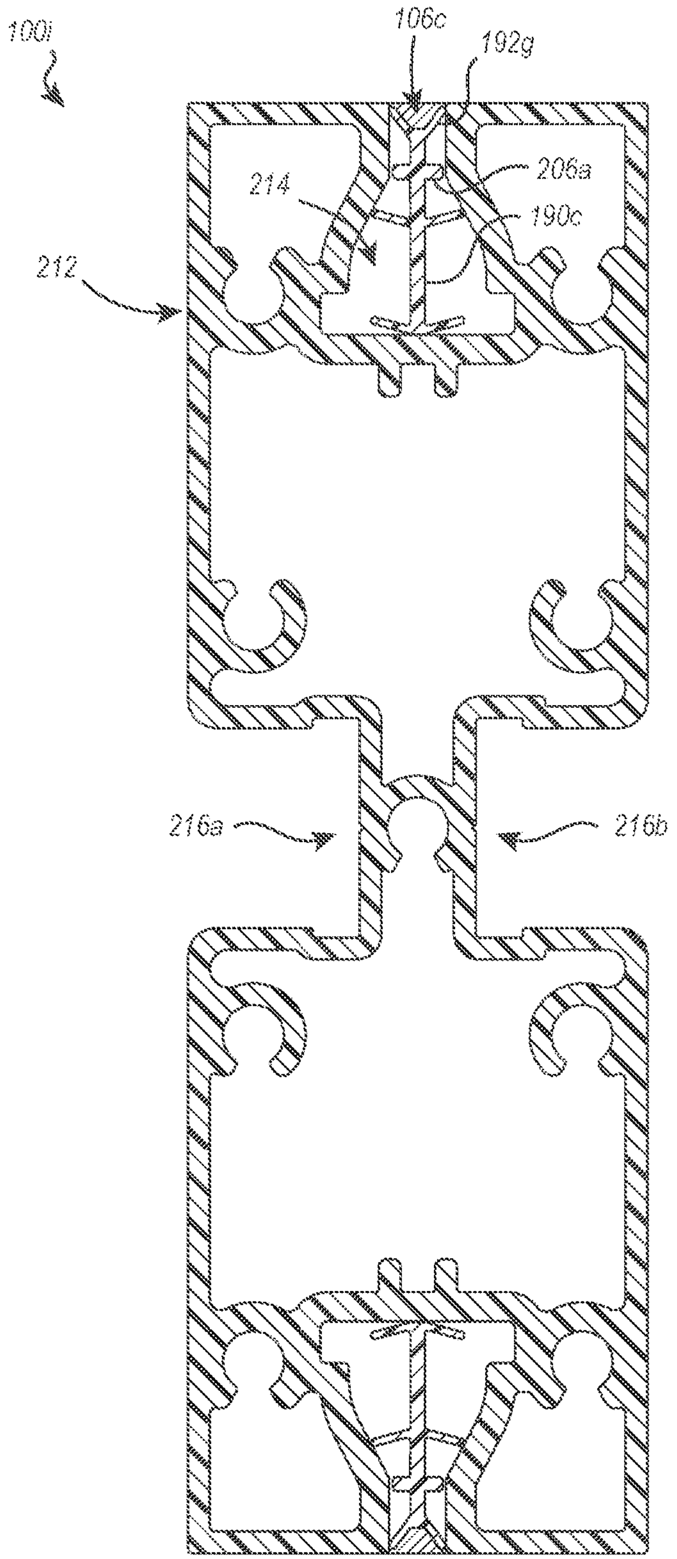
FIG. 9 illustrates a side profile cross-sectional view of a modular sealant system of the present disclosure for integration with a glass insert.

FIG. 9 illustrates a side profile cross-sectional view of a modular sealant system 100i, for integration with one or more glass insert. Glass inserts can be retained within insert slot 216a and 216b of frame member 212. Modular sealant system 100i can include frame member 212, first piece 190c, support 206a and sealant 106c. Though not illustrated glass inserts can be installed into inset slots 216a and 216b and can be sealed using a sealant of the present disclosure. First piece 190c can be configured to secure within space 214 which is defined by frame member 212. Bars 192g can be configured to define a geometry wherein sealant 106c can be inserted.

Accordingly, the present invention allows a user of a preexisting modular wall, or components of a preexisting modular wall, to upcycle their preexisting modular wall with the inclusion of elements of the present disclosure to construct a modular sealant system. For example, backers of the present invention provide a rigid backing member for a sealant to ensure that the sealant is retained under a variety of conditions. Backers of the present disclosure can register panels of a modular wall to maintain a minimum spacing between the panels and a consistent depth of sealant inserted. The sealant of the present disclosure can compress and expand with the wall system it communicates with. The sealant provides a uniform elevation along the face of a wall and prevents the ingress of fluids, gases, or contaminants.

Additionally, the present disclosure discloses several ways and methods of providing a modular sealant system. For example, in one embodiment the seal can be a vertical seal. In an embodiment, the seal can be a horizontal or diagonal seal. In an embodiment, the modular sealant system can provide a rounded inner corner seal. In an embodiment, the modular sealant system can seal between the floor and a wall. In an embodiment, the modular sealant system can seal between a modular wall and a conventional wall or preexisting wall.

The modular sealant systems of the present disclosure are adaptable and versatile sealing systems. In particular, the implementation of the present invention comprises components that enable a sterile and sealed surface to a new or existing wall system. In the case of a modular wall, the present disclosure provides a seal that can retain the modularity of a wall system. This means that in the case that access behind a panel of a modular wall is needed, a user or installer can score, cut, or otherwise separate a modular wall panel along the sealant and then remove the modular panel. Additionally, a user or installer can reinstall the same removed panel (or a new panel) and reseal the wall system without having to prepare, remove, or otherwise alter the remnants of the seal that may be present on the wall system of the modular wall panel. A user, installer, or manufacturer of modular walls will appreciate the ease and versatility of modular sealant systems of the present disclosure in the replaceability, resealability, and retained modularity of their modular wall. This advantageous flexibility provided by the present disclosure allows users of modular wall systems to retain the modular nature of their modular wall system while also having a sealed environment.

A sealed wall system, which comprises a modular sealant system, is highly advantageous in sterile environments such as hospitals, cleanrooms, and laboratories, where maintaining strict hygiene and contamination control is essential. By eliminating gaps, crevices, and other potential ingress points for dust, pathogens, and particulates, a sealed wall minimizes the risk of contamination and simplifies cleaning protocols. This design ensures that surfaces can be easily sanitized, preventing microbial growth and maintaining sterility over extended periods. Additionally, sealed walls help create controlled environments by improving air pressure stability, reducing cross-contamination risks, and enhancing temperature and humidity regulation, all of which are critical for patient safety, product integrity, and compliance with stringent industry standards. In such environments, a user can have full access to power, data, gas, fluid, ductwork, and other utilities and services that are run behind a wall without having to use a dedicated access port or worry about permanently degrading the sealed nature of their space.

The present disclosure may be embodied in other specific forms without departing from its spirit or essential characteristics. The described examples are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

We claim:

1. A modular sealant system consisting of:
- a first panel selectively coupled to a first horizontal member of a modular wall;
- a second panel selectively coupled to a second horizontal member of the modular wall;
- a backer, wherein the backer is:
  - selectively coupled to a first prong of a first vertical member of the modular wall and selectively coupled to a first prong of a second vertical member of the modular wall, and
  - configured to register the first panel and the second panel relative to each other;
- a geometry defined by an edge of the first panel, an edge of the second panel, and an end face of the backer; and
- a sealant having elastomeric properties configured to adhere and conform to the geometry;
- wherein the sealant occupies the geometry and forms a seal configured to prevent an ingress or an egress of air, moisture, and contaminants.

2. A modular sealant system comprising:
- a first panel selectively coupled to a first horizontal member of a modular wall;
- a second panel selectively coupled a second horizontal member of the modular wall;
- a backer in communication with the modular wall, the backer is selectively coupled to a first prong of a first vertical member of the modular wall and selectively coupled to a first prong of a second vertical member of the modular wall, wherein the backer is configured to register the first panel and the second panel relative to each other in a predefined orientation such that the first panel and the second panel are removably attached to the modular wall;
- a geometry defined by an edge of the first panel, an edge of the second panel, and an end face of the backer; and
- a mastic sealant comprising elastomeric properties, configured to adhere and conform to the geometry;
- wherein the sealant completely occupies the geometry and forms a seal configured to prevent an ingress or an egress of air, moisture, and contaminants.

3. The modular sealant system of claim 2, wherein the backer is a frame member of the modular wall.

4. The modular sealant system of claim 2, wherein the backer has a length substantially similar to a height or length of the modular wall.

5. The modular sealant system of claim 2, wherein the backer further comprises a guide disposed along a length of the end face.

6. The modular sealant system of claim 2 wherein:
- the backer selectively couples to a corner vertical member.

7. The modular sealant system of claim 6, wherein the end face is curved and has a constant radius.

8. The modular sealant system of claim 2, further comprising:
- the second panel selectively couples to the first horizontal member;
- a leveler configured to adjust an orientation of the modular sealant system relative to a floor; and
- a stopper configured to create a seal between the second panel and the floor.

9. The modular sealant system of claim 8, wherein the floor is curved and is received in a space between the first horizontal member, the stopper, and the second panel.

10. The modular sealant system of claim 2, wherein the backer comprises a first piece and a second piece.

11. The modular sealant system of claim 10, wherein the first piece comprises one or more first barbs and one or more second barbs wherein:
- the one or more first barbs extend from the end face;
- the one or more second barbs are configured for coupling the first piece within a receiving slot defined by the second piece.

12. The modular sealant system of claim 2 further comprising:
- the second panel selectively couples to the first horizontal member; and
- the backer is inserted into an internal portion of the first horizontal member.

13. The modular sealant system of claim 12, wherein the second panel is coupled to the first horizontal member by hanging, such that the second panel is suspended by the first horizontal member under a force of gravity.

14. The modular sealant system of claim 12, wherein the first horizontal member is configured to register the first panel and the second panel.

15. A method of installing the modular sealant system of claim 2, comprising;
- assembling the modular wall comprising the first panel and the second panel;
- installing the backer wherein the backer is in communication with a frame member of the modular wall; and
- applying the sealant into the geometry defined by the edge of the first panel, the edge of the second panel, and the end face of the backer.

16. The method of claim 15, further comprising smoothing an outer surface of the sealant to make a level elevation and curing the sealant.

17. The method of claim 15, wherein a single installer completes each act.

* * * * *